United States Patent [19]

Sard et al.

[11] 4,268,568

[45] May 19, 1981

[54] LUBRICATED ELECTRICAL CONTACTS

[75] Inventors: Richard Sard, Birmingham, Mich.; Kenneth R. Walton, Fanwood, N.J.

[73] Assignee: Bell Telephone Laboratories, Incorporated, Murray Hill, N.J.

[21] Appl. No.: 38,570

[22] Filed: May 14, 1979

[51] Int. Cl.[3] ........................ B32B 15/20; B32B 27/32; B32B 15/04

[52] U.S. Cl. .................................... 428/209; 428/336; 428/339; 428/421; 428/422; 428/463; 174/110 FC

[58] Field of Search ............... 428/422, 421, 336, 463, 428/209, 339; 174/110 FC; 252/58

[56] References Cited

U.S. PATENT DOCUMENTS

| | | | |
|---|---|---|---|
| 3,279,936 | 10/1966 | Forestek | 428/422 X |
| 3,510,337 | 5/1970 | Katzer et al. | 428/422 X |
| 3,551,202 | 12/1970 | Wright et al. | 428/422 X |
| 3,930,066 | 12/1975 | Ryan et al. | 428/422 X |

FOREIGN PATENT DOCUMENTS

| | | | |
|---|---|---|---|
| 130390 | 3/1978 | German Democratic Rep. | 174/110 FC |

OTHER PUBLICATIONS

Chemplast Inc. Brochure, "Fluoro Glide", C53 20M28N, Jun. 1, 1967.

*Primary Examiner*—Marion McCamish
*Assistant Examiner*—Alexander S. Thomas
*Attorney, Agent, or Firm*—Walter G. Nilsen

[57] ABSTRACT

The electrical contact is described which incorporates a fluorocarbon polymer film as the lubricant. A process for applying the lubricant is also described. Such contacts are advantageous because of reduced wear behavior and reduced thickness requirements for noble metals used on contact surfaces.

3 Claims, 3 Drawing Figures

LUBRICATED ELECTRICAL CONTACTS

TECHNICAL FIELD

The invention involves electrical contact devices employing surface lubricant.

BACKGROUND OF THE INVENTION

Electrical contacts are extensively used in electrical machinery, modern electronic devices and electrical devices. Because of their extensive use, particularly in modern switching and computer devices, high reliability is very important. Often to achieve high reliability, contact surfaces are plated with noble metals such as gold. Gold plated contacts or contacts plated with other noble metals provide high reliability and low electrical contact resistance. Thickness requirements for these noble metals depends greatly on the amount of friction involved in the use of the electrical connectors and the amount of wear experienced during operation.

To reduce the amount of friction and wear on separation of electrical connectors, it is often customary to use a lubricant or coating on the connector surface. The use of such lubricants does indeed reduce wear and surface friction. Stringent controls are necessary to control the thickness of the lubricant and prevent migration of the lubricant away from the electrical contact surface. This is necessary to prevent excessive contact resistance and to ensure continued lubrication throughout the active life of the connector.

SUMMARY OF THE INVENTION

The invention is an electrical contact device which has a thin adherent film of fluorocarbon polymer deposited on the contact surface. The fluorocarbon polymer is conveniently deposited on the contact surface using a radiofrequency induced plasma polymerization of fluorocarbon monomer gases. Any partially fluorinated or completely fluorinated polymer can be used including partially chlorinated and partially fluorinated polymers. Preferred are completely fluorinated polymers made from monomers with up to 20, or more preferably 10, carbon atoms. Partially fluorinated polymers include those polymers with more than 70 percent of the hydrogen atoms replaced by fluorine atoms. Particularly good results are obtained with tetrafluorethylene and perfluoropropene. These films provide low contact resistance, high thermal and chemical stability and excellent friction and wear behavior compared to unlubricated surfaces. In addition, such lubrication permits reduction in the thickness of noble metals used in electrical contact surfaces and also permits a higher density of electrical connectors and corresponding reduction in the size of connector hardware.

DETAILED DESCRIPTION

Figure 1:
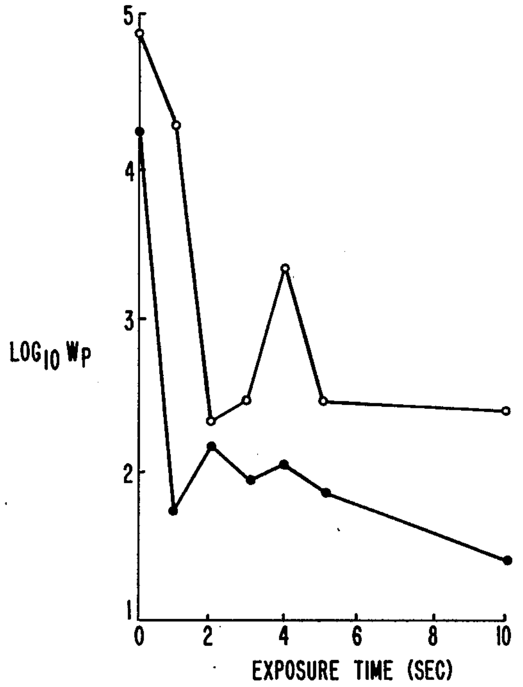
FIG. 1 shows a graph of the relationship between the amount of polymer deposited on the contact surface (in terms of time of exposure to the plasma) and wear on the contact surface.

The invention in its broadest aspects is a device with electrical contact surface in which the electrical contact surface is coated with a fluorocarbon polymer to facilitate lubrication and reduce wear and friction. The monomer for the fluorocarbon polymer may have up to 20 carbon atoms, but more preferably, up to 10 carbon atoms. Preferred monomers are tetrafluoroethylene, perfluoropropene and perfluoroheptene-1 .tetrafluoroethylene and perfluoropropene are preferred because they are gases and monomer pressure during polymerization can be adjusted over a much wider range. Perfluoroheptene-1 is a liquid and only limited partial pressures are available in the polymerization process. Tetrafluoroethylene is most preferred because of ease of controlling the polymerization, excellent lubricating properties of the polymer and great of availability.

The polymer may be applied to the contact surface in any way which produces an adherent, reasonably even coating. Polymerization in the vicinity of the surface is attractive because of convenience and possibility of strong adherence to the surface.

Particularly good results are obtained with a plasma polymerization procedure. Particularly attractive is radiofrequency (RF)-induced plasma polymerization of fluorocarbon monomer gas.

Satisfactory results are obtained under a wide variety of plasma polymerization conditions. Optionally, the substrate is first cleaned, generally by degreasing with trichloroethylene and then mounted in a deposition chamber. The substrate is electrically grounded during the deposition. The chamber is evaporated, generally to less than 5 millitorr.

Optionally, the substrate may be plasma cleaned by, for example, exposing the substrate to an argon plasma for three minutes at 500 millitorr at 70 watts RF input power. After evacuation, the monomer is introduced into the deposition chamber. The pressure is adjusted to between about 400–500 millitorr by suitable metering of the incoming gas against a vacuum pump. A plasma is then induced with a typical RF power input of 70 watts. Typical monomers are tetrafluoroethylene, perfluoropropene and perfluoroheptene-1.

Various modes of thin film plasma deposition may be used. Two typical modes are downstream deposition and in-plasma deposition. In the downstream procedure, the interelectrode separation is typically 4 inches with the grounded electrode 6 inches upstream from the substrate. The substrate is mounted at the cross-sectional center of the chamber and is isolated from the plasma. Typical deposition times for all monomers is 90 seconds. In the in-plasma deposition, a typical interelectrode separation is 5.5 inches. The substrate is located between the electrodes and approximately 2 inches from the hot electrode. Where lubrication is the principal concern, the deposition time is typically 5–10 seconds.

Contact surfaces are lubricated by exposing them to a monomer plasma. Thickness of polymer may vary over large limits, particularly where reduced friction, wear and long life are the primary concern. When lubrication is the prime consideration, film thicknesses over 250 Angstroms do not provide any additional advantages in terms of reduced friction, wear, and long life.

Various types of surfaces may be used for the contact surface but polished or smooth surfaces are preferred. Copper and nickel surfaces are typical. Included are alloys of these metals with each other and other metals. Particularly good contact surfaces are made by putting down films of various metals or alloys (usually metals or alloys with good electrical conductivity) onto the substrate material to insure good reliability. Because of low contact resistance, noble metals (Au, Ag, Ru, Rh, Pd, Os, Ir, Pt), particularly gold, are preferred as the contact metal. The noble metal films may be put down by a variety of procedures including evaporation, sputtering, plating, etc.

It is highly desirable to have a lubrication-resistance window in the thickness profile of the lubricant. In such a situation, there is a lubricant thickness where wear and friction is greatly reduced but contact resistance is not significantly increased.

Experiments were carried out on $1 \times 1 \times 0.040$ inch copper flats polished with 0.3 micron alumina powder. The surfaces were plated with hard gold to a thickness of approximately 50 microinches. A thin film of fluorocarbon polymer was deposited on each flat using RF-induced plasma polymerization. The in-plasma procedure was used with the sample electrically grounded, an RF power of 70 watts and a pressure of 500 millitorr for the tetrafluoroethylene monomer.

The polymer thickness was controlled by the time of exposure to the plasma. In order to calibrate the polymer film thickness, a series of samples were exposed to the polymer plasma for a long period of time. By measuring the weight increase in the samples as a function of deposition time, it was established that the amount of polymer deposited per unit time was approximately linear. One of the samples had an exposure time of 600 seconds and a weight increase of approximately of four milligrams. Using an interference microscope, it was established that the polymer film thickness for this sample was in the range of 2,500–5,000 Angstroms. Assuming a linear relationship for film thickness and deposition time, this establishes a thickness range of about 10–30 Angstroms for a three second film. Although this thickness range depends on a number of assumptions, it is reasonable to believe that this thickness is at least approximately correct, and undoubtedly less than 100 Angstroms.

The samples were tested for wear response with a device which causes a gold plated sphere with a diameter of 0.25 inches to slide back and forth over the surface. These tests were carried out using a 70 gram and a 255 gram load for 500 cycles at 30 cycles per minute. The data from these tests are summarized in FIG. 1. The top curve is for a 255 gram load and the bottom curve for a 70 gram load. As can be seen from the FIG., the wear is greatly reduced after only a small exposure (1–3 seconds) to the polymerizing plasma. This FIG. indicates that even small amounts of lubricating plasma film reduces the amount of wear dramatically.

Figure 2:
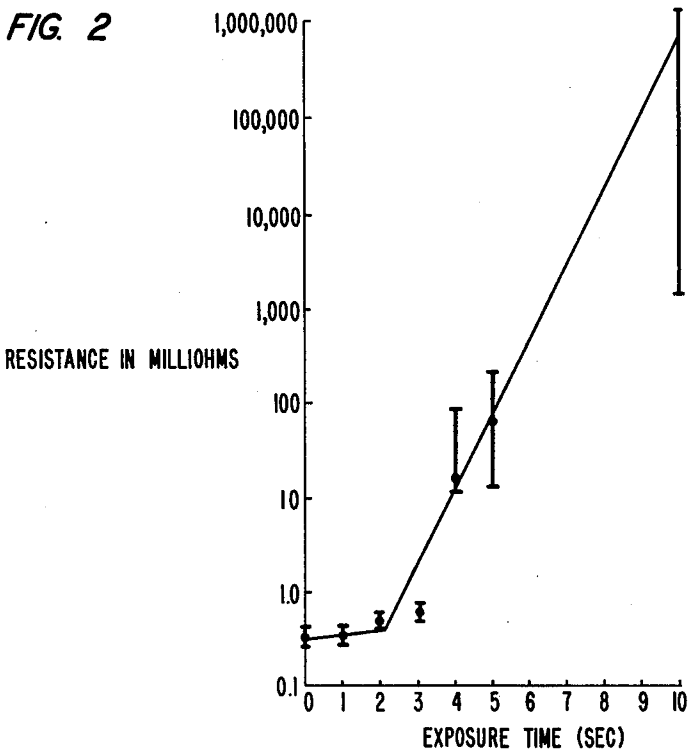
FIG. 2 shows a graph of the relationship between the amount of polymer deposited on the contact surface (in terms of time of exposure to the plasma) and contact resistance in units of milliohms.

Following the wear tests, contact resistance measurements were made on the surfaces using a 0.040 inch diameter gold wire supported on a 60 degree Teflon ® wedge as the mating contact member. Data were obtained with a contact resistance analyzer which provides graphically displayed voltage- current characteristics of the contacts using a four wire measuring technique. The contact resistance characteristics were obtained using a 100 gram force. These data are summarized in FIG. 2. As can be seen from the curve shown in FIG. 2, contact resistance is little affected up to 3 seconds of exposure to the plasma. This is in the same exposure time range where the wear characteristics in the surface are greatly reduced. Thus, there is a range of exposure times (and therefore thickness range) where friction and wear are greatly reduced without significant adverse effects on contact resistance.

Figure 3:
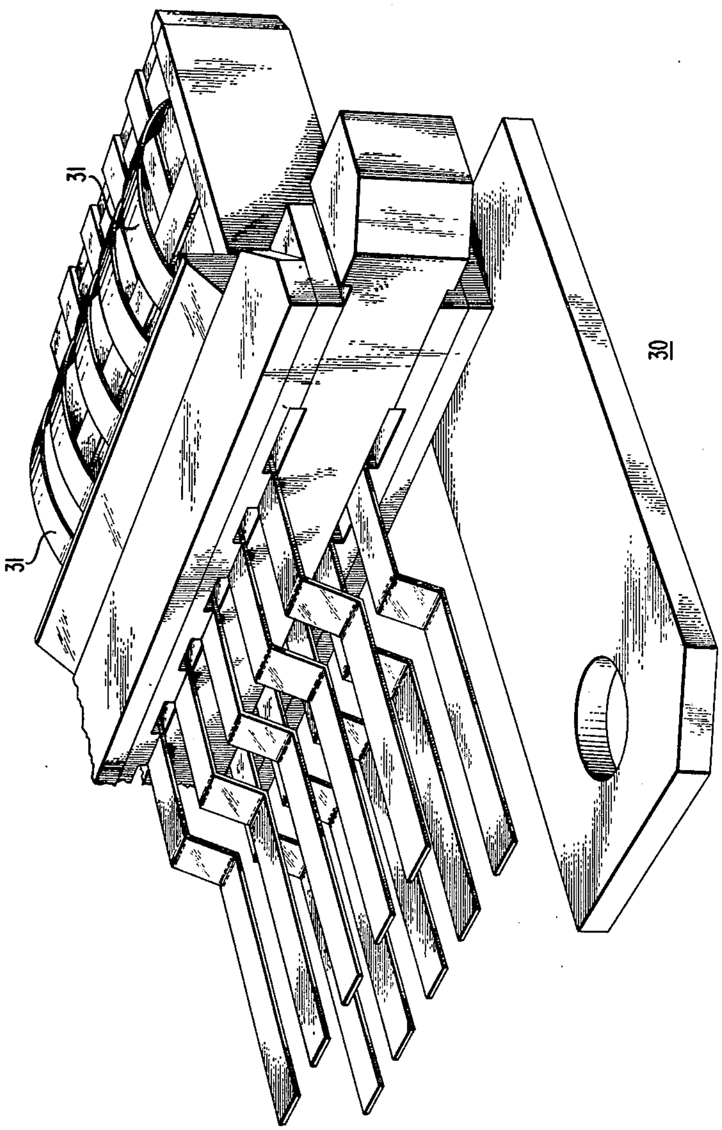
FIG. 3 shows a perspective view of a typical connector with lubricant.

FIG. 3 shows a typical electrical connector 30 with gold plated contact surfaces 31 which have been lubricated in accordance with the invention.

What is claimed is:

1. An electrical contact device comprising (a) electrical portion which carries current to an electrical contact surface, said electrical portion comprising a metal selected from the group consisting of copper and nickel;

(b) an electrical contact surface layer comprising a metal deposit on said electrical contact surface which consists essentially of gold;

(c) a lubricant that covers at least part of the electrical contact surface layer, said lubricant consisting essentially of a fluorocarbon polymer, and said lubricant having a thickness between 10 and 30 Angstroms.

2. The article of claim 1 in which the fluorocarbon polymer is selected from the group consisting of polytetrafluoroethylene, polyperfluoropropene and polyperfluoroheptene-1.

3. The article of claim 1 in which the lubricant is polymerized onto the electrical contact surface by radiofrequency-induced polymerization.

* * * * *